(12) United States Patent
Nasvik

(10) Patent No.: US 7,647,738 B2
(45) Date of Patent: Jan. 19, 2010

(54) PRE-CAST CONCRETE VENEER SYSTEM WITH INSULATION LAYER

(76) Inventor: Paul C. Nasvik, 320 River Rd., Hudson, WI (US) 54016

( * ) Notice: Subject to any disclaimer, the term of this patent is extended or adjusted under 35 U.S.C. 154(b) by 852 days.

(21) Appl. No.: 11/020,546

(22) Filed: Dec. 22, 2004

(65) Prior Publication Data

US 2006/0156668 A1 Jul. 20, 2006

(51) Int. Cl.
*E04F 13/08* (2006.01)

(52) U.S. Cl. .............................. 52/389; 52/384; 52/516

(58) Field of Classification Search ................. 52/384, 52/389, 391, 392, 489.2, 516; 249/1; 428/178
See application file for complete search history.

(56) References Cited

U.S. PATENT DOCUMENTS

| | | | | |
|---|---|---|---|---|
| 1,879,457 A * | 9/1932 | Paulsen | | 52/714 |
| 2,129,975 A * | 9/1938 | Urbain | | 52/489.2 |
| 2,200,649 A * | 5/1940 | Wardle | | 52/489.2 |
| 2,944,716 A * | 7/1960 | Hoogstoel | | 220/62.11 |
| 3,445,322 A * | 5/1969 | Saiia et al. | | 428/178 |
| 3,577,694 A * | 5/1971 | Omholt | | 52/506.1 |
| 3,621,625 A * | 11/1971 | Medow | | 52/314 |
| 3,868,801 A * | 3/1975 | Weiner | | 52/309.5 |
| 4,052,831 A * | 10/1977 | Roberts et al. | | 52/309.8 |
| 5,072,562 A | 12/1991 | Crick et al. | | |
| 5,076,037 A | 12/1991 | Crick et al. | | |
| 5,305,570 A | 4/1994 | Rodriguez et al. | | |
| 5,323,581 A * | 6/1994 | Jakel | | 52/519 |
| 5,347,784 A | 9/1994 | Crick et al. | | |
| 5,526,630 A * | 6/1996 | Francis et al. | | 52/745.19 |
| 5,537,792 A | 7/1996 | Moliere | | |
| 5,900,180 A * | 5/1999 | Scott et al. | | 249/61 |
| 6,634,617 B2 * | 10/2003 | Potvin | | 249/16 |
| 6,684,587 B2 | 2/2004 | Shaw et al. | | |
| 6,737,008 B2 | 5/2004 | Gilbert et al. | | |
| 6,808,667 B2 * | 10/2004 | Nasvik et al. | | 264/219 |

OTHER PUBLICATIONS

Progressive Foam Technologies, Inc., *Fullback Thermal Support System Brochure*.
Stucco Stone Products, Inc., *Cultured Stone*, 1991, pp. 1-2, 4-5, 10-14, 30-33, 38-39, 41-43.

* cited by examiner

*Primary Examiner*—Basil Katcheves
(74) *Attorney, Agent, or Firm*—Kinney & Lange, P.A.

(57) ABSTRACT

A multi-layered panel comprises a first layer made of concrete, a second layer made of foam and an edge perimeter region. The first layer is a thin concrete layer of near uniform thickness that is cast onto the second layer. The exterior surface of the concrete layer simulates an exterior surface of a building. The front of the foam layer has dimensions designed to accommodate the application of the concrete layer. The back of the foam layer has features that assist in mounting the panel on an exterior surface of a building. The edge perimeter region includes a system for interconnecting adjacent multi-layered panels.

20 Claims, 14 Drawing Sheets

PRE-CAST CONCRETE VENEER SYSTEM WITH INSULATION LAYER

BACKGROUND OF THE INVENTION

The present invention relates to veneer systems for finishing the exterior appearance of walls. In particular, the present invention relates to concrete and foam layered veneer panels which can be inexpensively and easily installed to form a wall facade which resembles a wall made from a more expensive and more difficult to install material, such as stone, brick or wood.

Many types of materials are used to form the exterior finish of buildings. Many factors go into choosing the exterior finish for each building, including appearance, cost, ease of installation, durability and insulating capacity. Stone, brick and wood finishes are popular due to their aesthetic appearance and durability. In particular, cut stone, natural stone, brick, log siding, shingle siding, and lap siding are examples of systems used as exterior finishes for building walls.

Stone walls are particularly pleasing because of the unique appearance of each stone and the random pattern the stones create. Stone is also extremely durable and able to withstand thermal and solar degradation. However, building such a wall using either natural or cut stones is not always a practical option. Constructing a wall made of stone is often very expensive, labor intensive, and requires highly skilled laborers. In addition, specialized equipment and tools may be required. Similar advantages and drawbacks occur with log homes, brick homes, shingle siding and lap siding.

A variety of simulated texture wall products have been developed in an attempt to make walls resemble ones made of a more desirable finish, but are less expensive and more easily installed.

One type of a simulated wall is made using poured concrete. In these "pour in place" walls, concrete is poured into a form containing liners that have a reverse impression of a random pattern of stone or brick. After the concrete material hardens, the forms and form liners are removed to reveal a simulated stone wall.

Pour in place applications have problems associated with making the wall look natural. When erected, the poured walls repeat themselves creating a noticeable pattern on the wall as a whole. In addition, form liners create a seam where the forms come together that is visible in the finished product. Poured in place walls are also extremely heavy, are not useable in a wide variety of applications, and require special equipment and skilled labor to install.

In addition to pour in place walls, it is also possible to precast sections of walls. Each section has a surface shaped to resemble stone or other finishes. Precast systems are created by casting the wall sections at a remote location, and moving the precast wall sections to the work site. Precast walls have similar repetitive pattern and seam problems as do pour in place walls. These walls are also extremely heavy and require skilled labor and special equipment.

Also, veneer systems are used to simulate exterior surfaces. Veneer systems consist of paneling which can be attached to a wall surface, similar to exterior siding or interior paneling. The veneer panels maybe formed to have a simulated surface of stone or other such pattern. However, many of these veneer systems, particularly those made of vinyl products, are not realistic in texture or appearance. In addition, the same problems arise in the inability to create a random pattern of unique stones using a minimum number of veneer panels. Veneer systems are particularly susceptible to "paneling out", wherein it becomes obvious that the pattern is repeating and non-random.

Concrete has a realistic texture and feel, and resembles stone and wood more than other types of building materials. Thus, concrete is a particularly suitable, and the preferred, material for constructing panels for simulating stone, wood or other natural surfaces. Concrete also has many of the ideal characteristics for finishing a building exterior, such as durability and weather resistance. However, forming a veneer system using concrete has been impractical to date. In particular, concrete veneers may be thick, making them heavy, unwieldy and difficult to install. In addition, when made thin enough to be more practical, the concrete may crack or break easily, such as during shipping or during the installation process.

As demonstrated, existing systems, both using and not using concrete for simulating exterior finishes, have several problems associated with them. In a simulated stone wall it is difficult to ensure that the pattern appears random and non-repetitive. The number of form liners, precast, or veneer pieces can be increased to alleviate this problem. This, however, increases cost and labor. Increasing the variety of patterns can be expensive. In pour in place and precast wall systems, the solid concrete walls are heavy and require skilled labor and special equipment to install.

Thus, there is a need in the industry for a light-weight panel system that accurately reproduces the look and feel of stone, wood or other natural finishes. In particular, there is a need for fabricating inexpensive, light-weight and durable panels made of concrete that can realistically reproduce natural finishes.

BRIEF SUMMARY OF THE INVENTION

The present invention comprises a multi-layered veneer panel. The multi-layered panel comprises a first layer made of concrete, a second layer made of foam and an edge perimeter region. The first layer is a thin concrete layer of near uniform thickness that is cast onto the second layer. The exterior surface of the concrete layer simulates an exterior surface of a building. The front of the foam layer has dimensions designed to accommodate the application of the concrete layer. The back of the foam layer has features that assist in mounting the panel on an exterior surface of a building. The edge perimeter region includes a system for interconnecting adjacent multi-layered panels.

The invention also includes a method for making a multi-layered panel. The method involves casting a thin concrete layer onto a preformed foam layer. The invention also discloses a method for installing the multi-layered panels using a specially designed fastener. The fastener can be easily fixed to a wall or surface and also secures the placement of multi-layered panels above and below the fastener.

DETAILED DESCRIPTION

Figure 1A:
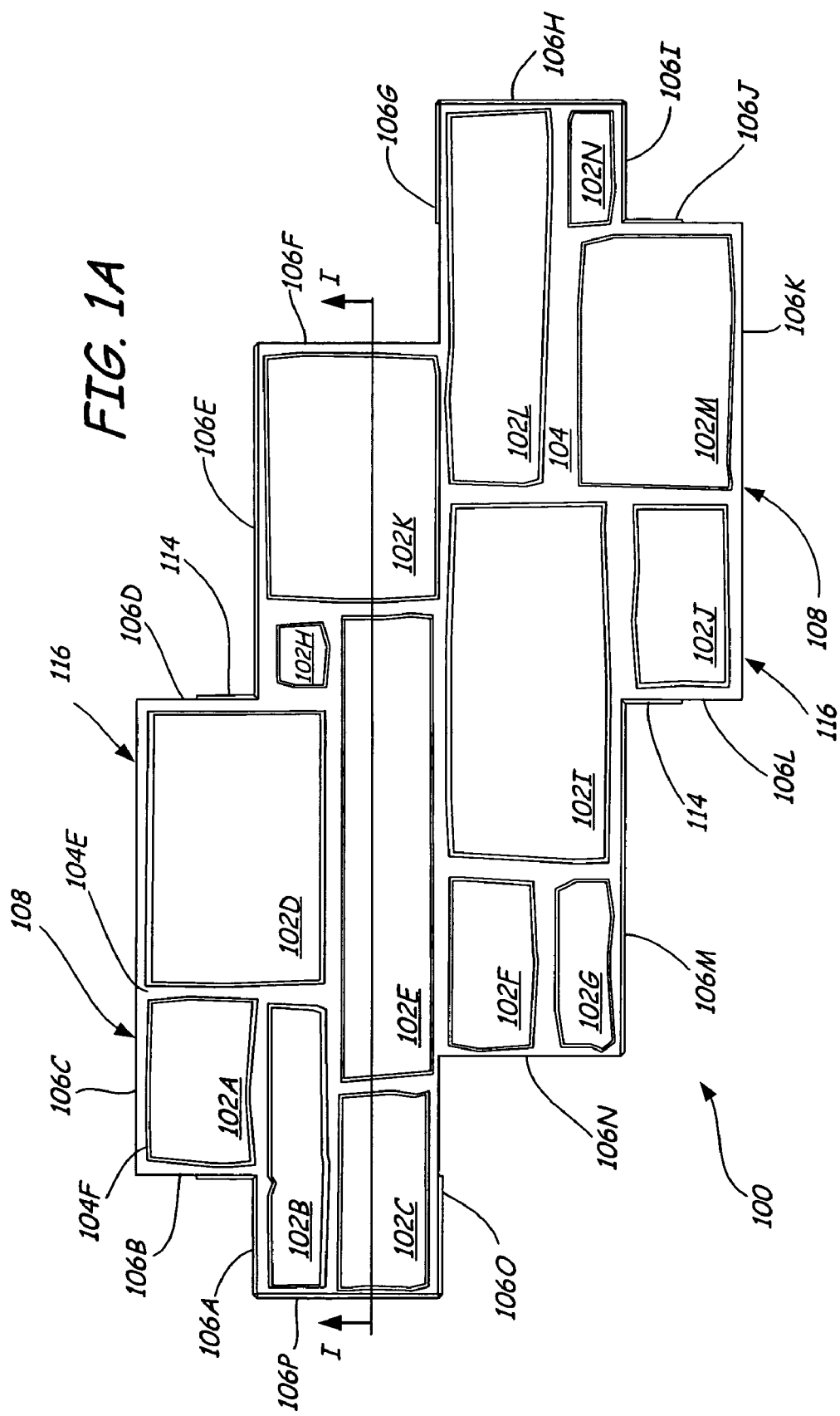
FIG. 1A shows a front-view of a multi-layered panel.

FIG. 1A shows a front view of multi-layered panel 100, which is part of a veneer system for finishing an exterior wall. In this embodiment, the front of multi-layered panel 100 shows a simulated cut stone pattern with simulated regions of mortar filling the space between the stones. In this embodiment, there are fourteen individual stones 102A-102N. Individual stones 102A-102N each have a unique look and are arranged to appear carefully stacked thus creating regions of mortar 104 with even spacing between the stones. Individual stones 102A-102N are represented by raised regions protruding beyond the surface of multi-layered panel 100 and mortar 104 is represented by lowered regions.

Multi-layered panel 100, in this embodiment, utilizes a multi-edged shape to facilitate the appearance of natural cut and stacked stones. In this embodiment the multi-layered panel 100 has sixteen sides 106A-106P. Side 106A is the same length as side 106I. Side 106B is the same length as side 106L. Side 106C is the same length as side 106K. Side 106D is the same length as side 106J. Side 106E is the same length as side 106M. Side 106F is the same length as side 106N. Side 106G is the same length as side 106O. Side 106H is the same length as side 106P. Thus, multi-shaped panel 100 has edge symmetry when rotated one hundred eighty degrees.

The multi-edged shape allows individual stones 102A-102N to have various shapes and to be neatly stacked within the perimeter of multi-layered panel 100. The placement of variously shaped stones and the multi-edged shape help to conceal the repetitive nature of using multiple multi-layered panels 100.

Multi-layered panel 100 also comprises edge perimeter region 108. Edge perimeter region 108 encircles the entire multi-layered panel 100. Edge perimeter region 108 includes tongues 114 and grooves 116 of a tongue and groove system for interlocking multiple, adjacent multi-layered panels 100. Edge perimeter region 108 always begins in a lowered region of mortar 104 such that the width of the mortar 104 at the edge is less than what it normally would be as between two individual stones 102A-102N. For example, the region of mortar 104E between stones 102A and 102D is generally greater in width than the region of mortar 104F between stone 102A and the edge perimeter region 108. Thus, when coupled with an adjacent multi-layered panel 100, two partial regions of mortar 104E at the edge of each multi-layered panel 100 will create one whole region of mortar 104. This feature also helps to conceal the use of multiple multi-layered panel 100.

Figure 1B:
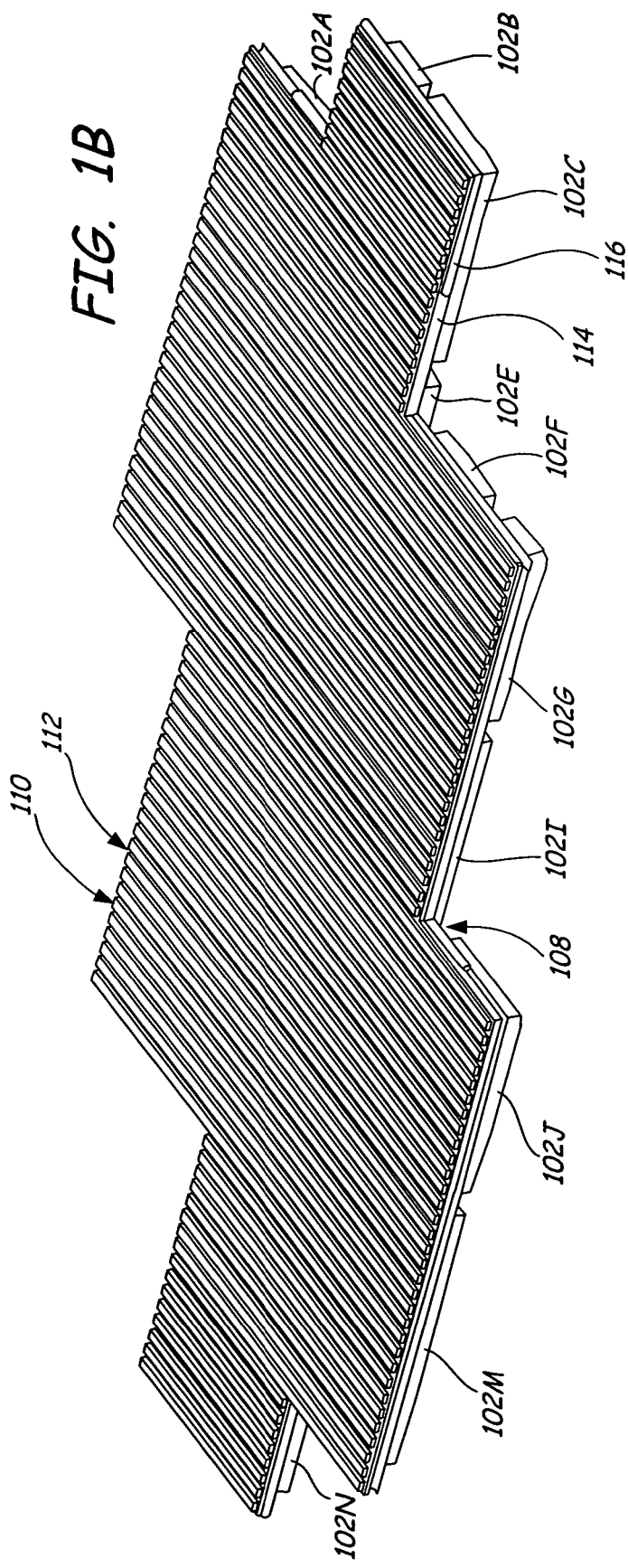
FIG. 1B shows the back side of a multi-layered panel.

FIG. 1B shows the back side of multi-layered panel 100, which comprises a series of standoffs or ribs 110 and grooves 112. The channels 112 run vertically along multi-layered panel 100. The ribs 110 and grooves 112 form a channel that facilitates air flow between multi-layered panel 100 and the surface to which it will be attached. Air flow between multi-layered panel 100 and the surface to which it will be attached is important to prevent problems associated with mold and moisture. Other types of channels or grooves can also be featured on the back side of multi-layered panel 100 to facilitate air flow.

Edge perimeter region 108 can also be seen. Edge perimeter region 108 comprises an interlocking means for connecting multiple, adjoining multi-layered panels 100 in an installed veneer system. In this embodiment, the interlocking means is a tongue and groove system. Tongue 114 extends beyond the outside perimeter of multi-layered panel 100, while groove 116 is recessed within the edge perimeter region 108. When adjoining multi-layered panels 100 are installed as part of a veneer system, tongue 114 of one multi-layered panel 100 fits into groove 116 of an adjoining multi-layered panel 100. Tongue 114 and groove 116 are distributed around the edge perimeter region 108 such that adjacent multi-layered panels 100 will always be properly interlocked together in each of the one hundred eighty degree rotated configurations.

Figure 1C:
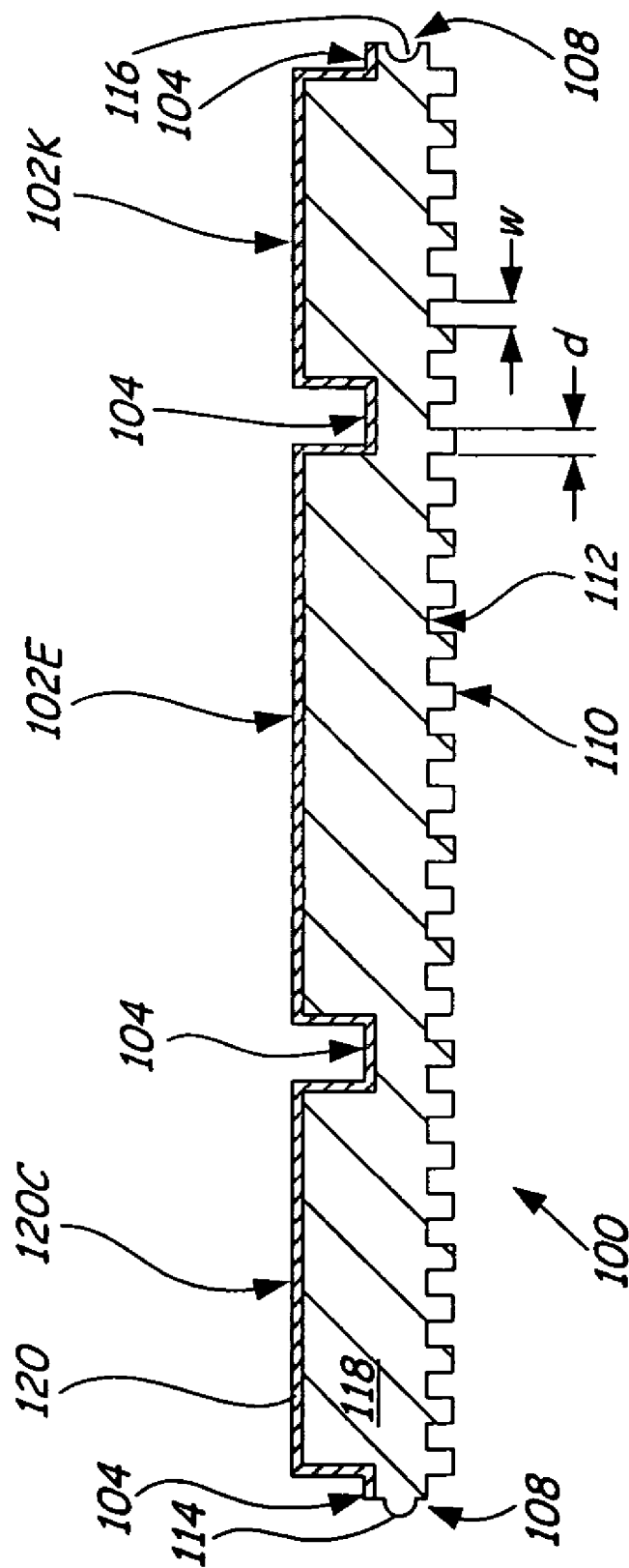
FIG. 1C shows a cross-section view of a multi-layered panel taken along a plane normal to the front surface of the multi-layered panel.

FIG. 1C is cross-section I-I of multi-layered panel 100 from FIG. 1A. Multi-layered panel 100 is comprised of foam layer 118 arid concrete layer 120.

Concrete layer 120 simulates the look of a stone wall. The use of concrete in multi-layered panel 100 realistically simulates the texture and likeness of a stone wall or other building finishes. Individual stones 102C, 102E and 102K are shown as raised regions. Simulated mortar 104 fills in the space between individual stones 102C, 102E, 102K and at the edges of the individual stones 102C and 102K. Concrete layer 120 is cast with a uniform thickness onto the surface of foam layer 118. In preferred embodiments it is 0.25 to 0.375 inches thick.

Foam layer 118 completely fills in the back of concrete layer 120, providing a solid backing that supports concrete layer 120. Foam layer 118 also provides an easily shapable, lightweight material for forming other features that enhance multi-layered panel 100.

Foam layer 118 of multi-layered panel 100 comprises ribs 110 and grooves 112 that form a channel having a width w on its back surface. The ribs 110 are designed to allow airflow between multi-layered panel 100 and the surface to which it will be mounted. The ribs 110 have a width d that is smaller than the channel width w. In one embodiment, d is 0.75 inches and w is 1.25 inches. Ribs 110 also serve as a surface for application of double sided adhesive tape to allow easy installation of multi-layered panel 100 onto a flat surface. Other fastening methods can also be used to install multi-layered panel 100.

Foam layer 118 also forms part of edge perimeter region 108. Tongue 114 and groove 116 of the interlocking system are shown. Tongue 114 extends beyond the cement layer 120 while groove 116 is recessed within foam layer 118. Edge perimeter region 108 can also have no interlocking system features or other types of interlocking systems.

Figure 2:
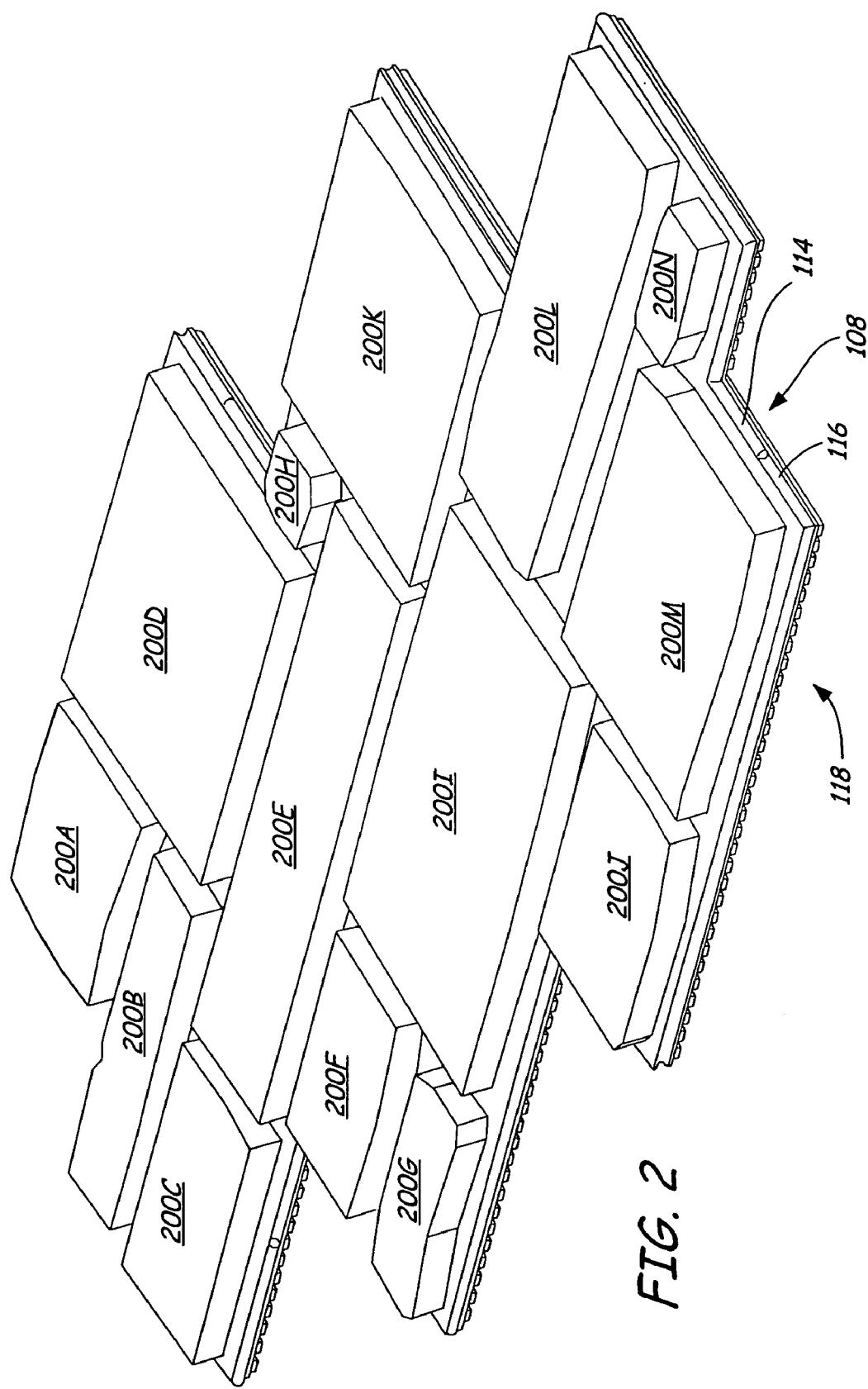
FIG. 2 shows the front side of the foam layer of a multi-layered panel.

FIG. 2 shows the front side of foam layer 118. Concrete layer 120 is cast onto foam layer 118. The front side of foam layer 118 has the topology of a desired surface finish for a wall. The topology features of foam layer 118 provide a foundation for concrete layer 120. The dimensions of the topology features on the front side of foam layer 118 are designed such that when the front side of foam layer 118 is built up with concrete layer 120, the finished multi-layered panel 100 will have the dimensions of the desired simulated exterior finish. Accordingly, the gaps between the foam that comprise each stone base 200A-200N of the finished multi-layered panel 100 is larger than the gaps between each stone 102A-102N of multi-layered panel 100.

Multi-layered panel 100 is constructed using a casting technique. Multi-layered panel 100 is made by casting concrete layer 120 onto a preformed foam layer 118. It is desirable to have concrete as the exterior finish of multi-layered panel 100 because it accurately replicates the look and texture of stone and other natural finishes and also has superior durability. Concrete layer 120 is preferably 0.25-0.375 inches thick. This creates a panel with decreased weight and good weight distribution. This also reduces the amount of concrete needed to create each panel, which helps keep manufacturing costs down. Foam is the preferred backing layer for concrete layer 120 because it is lightweight, it has good insulating characteristics and it is easily shaped in manufacturing. Preformed foam layer 118 can be made with a casting technique or any other suitable method. The foam can easily be shaped to include ribs 110 and grooves 112 for providing ventilation between multi-layered panel 100 and the surface to which it will be mounted. Systems for interconnecting adjacent multi-layered panels 100 can be easily incorporated into edge perimeter region 108 of foam layer 118. For example, tongues 114 and groove 116 can easily be formed on edge perimeter region 108. The interconnecting systems can be formed integrally as part of the preformed foam layer 118 or can be added to the foam layer 118 with additional finishing steps. Other materials can also be used as the backing layer for concrete layer 120. The combination of a thin concrete layer and a foam backing layer creates a panel that is extremely lightweight. Lightweight panels are easier to handle, transport and install. Having a light-weight panel also makes it possible to create larger panels. Larger panels reduce the number of seam lines on finished walls and reduces the noticeability of repeated panels.

The major components, involved in making multi-layered panel 100 include a mold, a preformed foam layer 118, a temporary backing and a concrete mixture. The mold has a cavity with the reverse impression of the pattern that is to present the outside surface of multi-layered panel 100. The preformed foam layer 118 is inserted into the mold cavity in order to seal the mold. The preformed foam layer 118 is created so that when the thin concrete layer 120 is cast onto it, the final dimensions of multi-layered panel 100 will be that of the desired exterior finish. The temporary backing is used to limit the amount the preformed foam layer 118 can be inserted into the mold. The temporary backing is temporarily affixed to the back of the preformed foam layer 118. The concrete mixture is distributed within the mold cavity for creating concrete layer 102. The concrete mixture is preferably a fiber reinforced composite that is lightweight, durable and will adhere to foam layer 118.

The method of casting multi-layered panel 100 involves several steps. First, the temporary backing is placed on foam layer 118 to limit the amount foam layer 118 can be inserted into the mold. This is set, in one embodiment, to 0.25 inches. Thus, when preformed foam layer 118 is placed into the mold, there is a 0.25 inch space between the surface of the mold and the surface of preformed foam layer 118. Next, any dyes or additives are added to the mold cavity. Liquid or powder dyes can be applied in various patterns and quantities to enhance the final appearance of multi-layered panel 100. Dyes can be used to change the color of the concrete mixture and to give the concrete the appearance of a desired texture. Next, a predetermined amount of concrete mixture is placed into the mold cavity. In one embodiment, the concrete mixture is sprayed onto the surface of the mold cavity. An amount of concrete mixture can be used that equals the volume of the closed mold chamber. Next, preformed foam layer 118 is inserted into the mold cavity. The temporary backing ensures preformed foam layer 118 is inserted to the proper depth. Preformed foam layer 118 is secured to the mold to prevent movement. The concrete mixture will bond to preformed foam layer 118 as it hardens. The dyes or additives will color the concrete mixture at the surface of the mold. After the concrete mixture hardens, preformed foam layer 118 can be removed from the mold. The concrete mixture will have formed a thin, uniformly-thick concrete layer 120 on the surface of preformed foam layer 118. Finally, the temporary backing can be removed from preformed foam layer 118. Finished multi-layered panel 100 will have a concrete finish that realistically resembles a stone, wood, or brick finish.

Although the method describes the preformed foam layer being inserted into a mold in order to form the concrete layer, other suitable methods can also be used including casting the concrete mixture directly onto the preformed foam layer.

Figure 3:
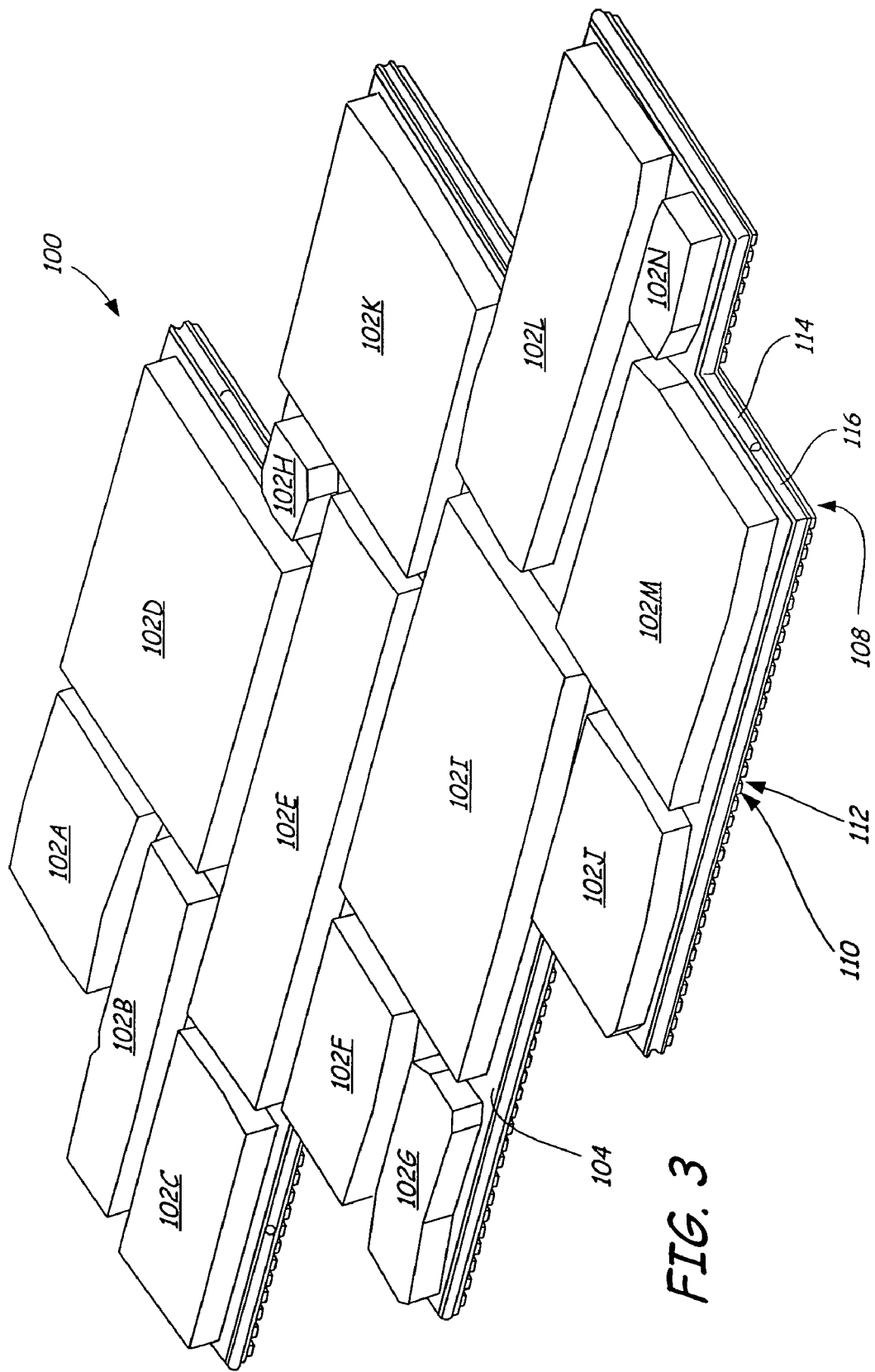
FIG. 3 shows a perspective view of a multi-layered panel.

FIG. 3 shows a perspective view of multi-layered panel 100 having concrete layer 120 cast onto foam layer 118. This view shows the depth of the elevated regions comprising the stones 102A-102N as compared to the mortar 104 regions. Edge perimeter region 108 and tongues 114 and grooves 116 of the interlocking system are still visible after concrete layer 120 has been cast onto foam layer 118. Ribs 110 and grooves 112 are also still visible.

Figure 4A:
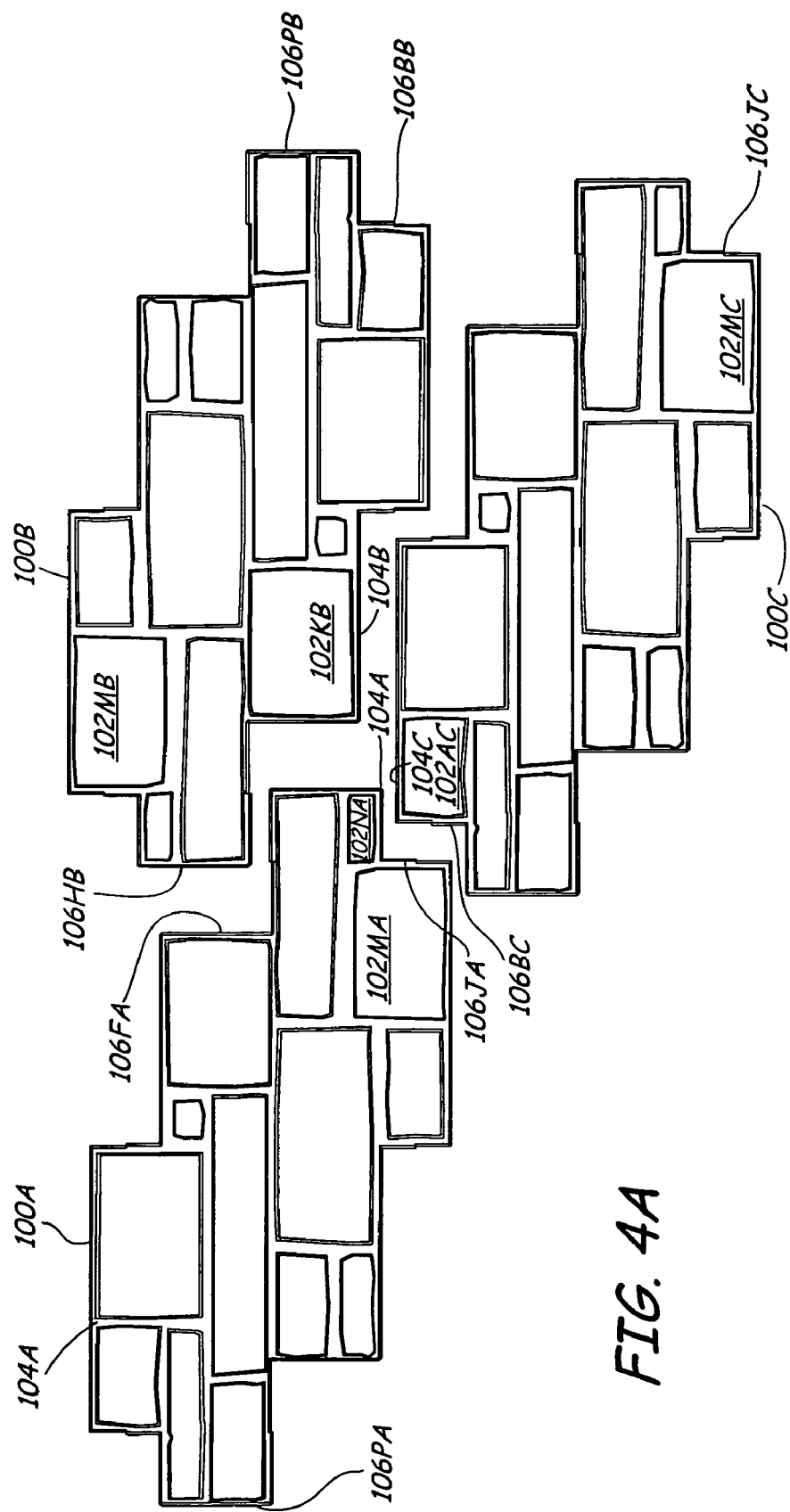
FIG. 4A shows three multi-layered panels coming together.

FIG. 4A shows three multi-layered panels 100A, 100B, 100C coming together. At the edge of each multi-layered panel 100A, 100B, 100C, the regions of mortar 104A, 104B, 104C are of a reduced width When adjoining multi-layered panels 100A, 100B, 100C are placed together the regions of mortar 104A, 104B, 104C that are reduced in width form one region of mortar of uniform width This aids in concealing the artificial and repetitive nature of multi-layered panels 100A, 100B, 100C.

Multi-layered panels 100A, 100B, 100C are designed to be placed directly next to each other and directly above and below each other. The many sided shape of multi-layered panels 100A, 100B, 100C allows each multi-layered panel 100A, 100B, 100C to be installed in two orientations for every situation. Multi-layered panels 100A, 100B, 100C can be installed in a first configuration or in a one hundred eighty degree rotation of the first configuration.

First panel 100A sits in the upper left side of FIG. 4A. Second panel 100B is located directly to the right of first panel 100A. Side panel 100HB is designed to fit against side 106FA of multi-layered panel 100A. Second panel 100B is rotated one hundred and eighty degrees as compared to first panel 100A. Side 106PA of multi-layered panel 100A is on the left side of multi-layered panel 100A. The equivalent side, side 106PB, of multi-layered panel 100B is on the right side of multi-layered panel 100B. Second panel 100B could also be placed where it is, but rotated one hundred eighty degrees. Thus, side 106PB could is also designed to fit against side 106FA of multi-layered panel 100A. Similarly, stone 102MA is in the lower right side of multi-layered panel 100A, while stone 102MB is in the upper left side of multi-layered panel 100B.

Third panel 100C is located directly below second panel 100B. Side 106BC is designed to fit against side 106JA. Third panel 100C is rotated one hundred eighty degrees as compared to second panel 100B. Side 106BB of multi-layered panel 100B is on the right side of multi-layered panel 100B. The equivalent side, side 106BC, of multi-layered panel 100C is on the left side of multi-layered panel 100C. Third panel 100C could also be placed where it is, but rotated one hundred eighty degrees. Thus, side 106JC is also designed to fit against side 106JA of multi-layered panel 100A. Similarly, stone 102MC is in the lower right side of multi-layered panel 100C, while stone 102MB is in the upper left side of multi-layered panel 100B.

Multi-layered panels 100A, 100B, 100C can thus be placed directly above, below and next to each other in random orientations to create a wall that simulates the random placement of unique stones in a real stone wall. The tongues 114 and groove 116 of the tongue and groove interconnect system are arranged to allow installation in the two orientations.

Figure 4B:
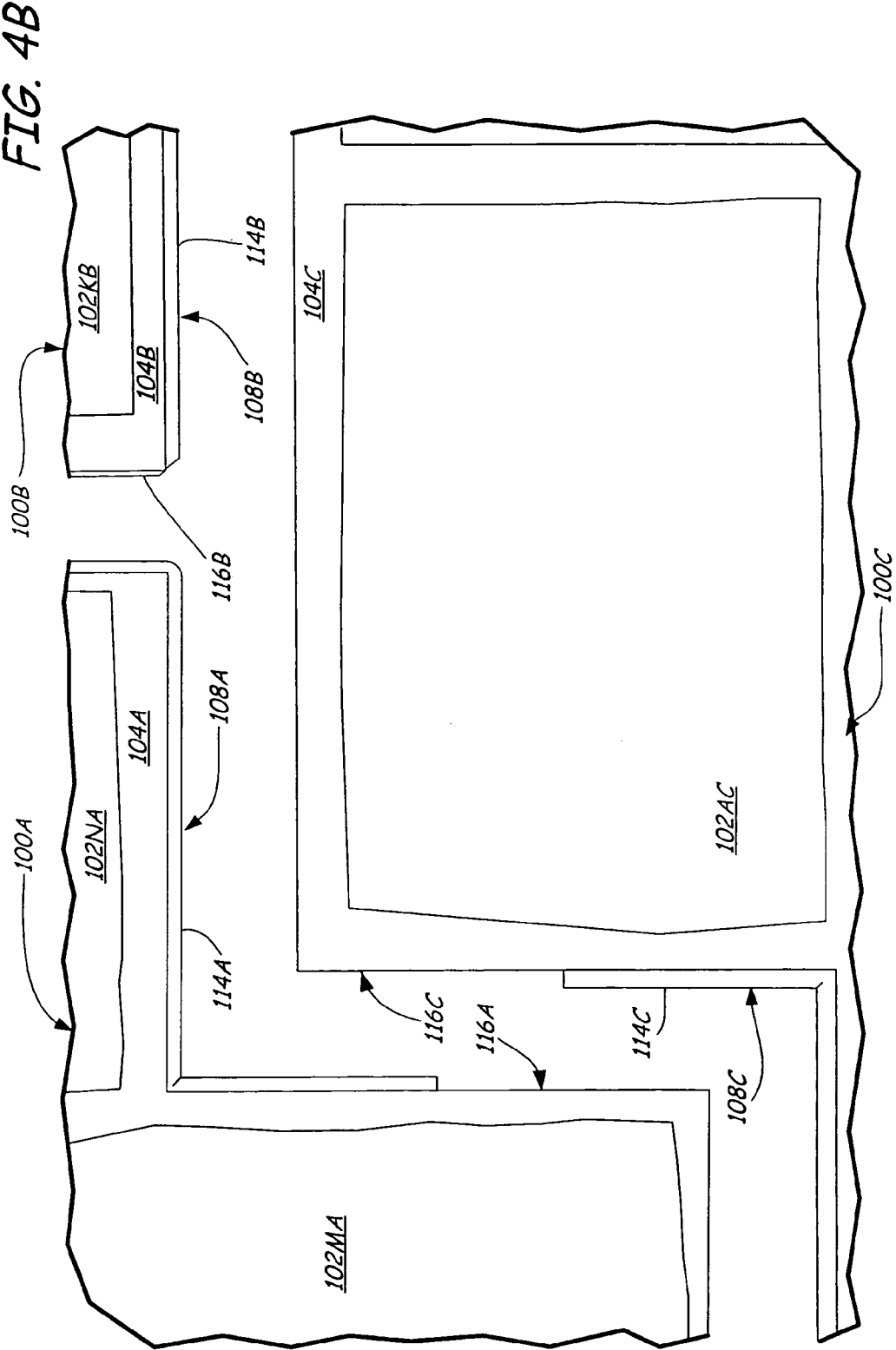
FIG. 4B shows a close up of three multi-layered panels coming together.

FIG. 4B shows a close up of edge perimeter regions 108A, 108B,108C of three multi-layered panels 100A, 100B, 100C coming together. Stones 102MA, 102NA, 102KB, 102AC of FIG. 4A can be seen. In this view it can be seen how tongues 114A, 114B, 114C and groove 116A, 116B, 116C of adjacent multi-layered panels 100A, 100B, 100C interlock. Tongues 114A, 114B, 114C and groove 116A, 116B, 116C are distributed around edge perimeter regions 108A, 108B, 108C such that adjacent multi-layered panels 100A, 100B, 100C will always match up. Tongue 114A of first multi-layered panel 100A fits into grooves 116B, 116C of adjacent multi-layered panels 100A, 100B. Similarly, tongue 114B of second multi-layered panel 100B fits into groove 116C of third multi-layered panel 100C. Tongue 114C of third multi-layered panel 100C fits into groove 116A of first multi-layered panel 100A. Tongues 114A, 114B, 114C and grooves 116A, 116B, 116C will line up for either one hundred eighty degree orientation of each multi-layered panel 100A, 100B, 100C. Each multi-layered panel 100A, 100B, 100C has tongues 114A, 114B, 114C and grooves 116A, 116B, 116C symmetry when rotated one hundred eighty degrees. When multi-layered panels 100A, 100B, 100C are interlocked, the exposed tongues 114A, 114B, 114C is completely enclosed in adjoining grooves 116A, 116B, 116C of adjoining multi-layered panels 100A, 100B, 100C. Thus, when installed as part of the veneer system the tongue and groove system is completely concealed.

Figure 5:
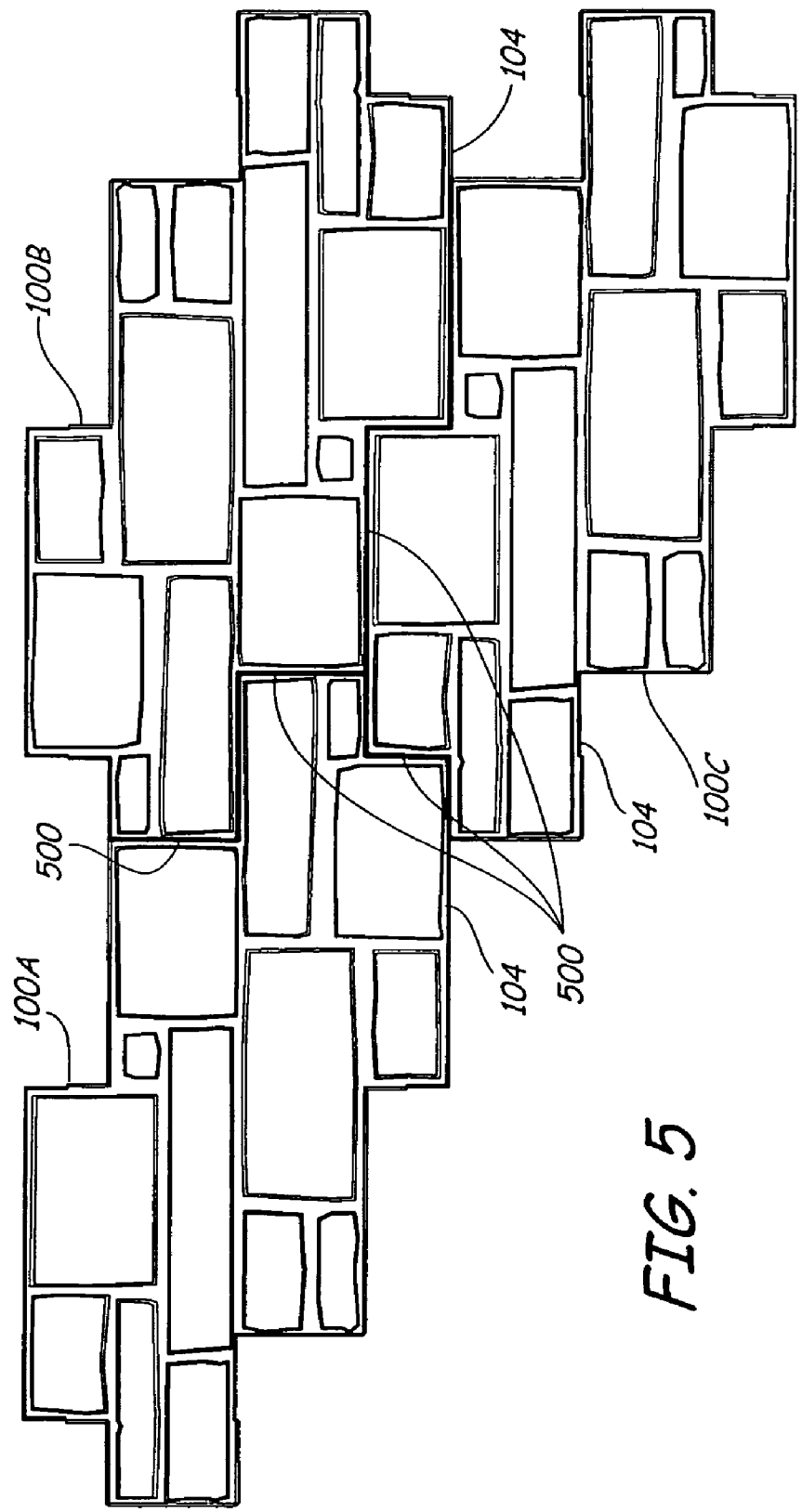
FIG. 5 shows three multi-layered panels interconnected together.

FIG. 5 shows three multi-layered panels 100A, 100B, 100C interconnected together. Arrow 500 points to the edges of adjoining multi-layered panels 100A, 100B, 100C. At the edge of each multi-layered panel 100A, 100B, 100C, the regions of mortar 104 are of a reduced width. When adjoining multi-layered panels 100A, 100B, 100C are placed together the regions of mortar 104 that are reduced in width form one region of mortar 104 of standard width. This aids in concealing the artificial and repetitive nature of multi-layered panels 100A, 100B, 100. It can also be seen how the foam layers of each multi-layered panel 100A, 100B, 100C are completely hidden from view in interlocked panels 100A, 100B, 100C. The interconnected multi-layered panels 100A, 100B, 100C together form an integrated wall facade with minimal seam lines and a non-repetitive look.

Figure 6:
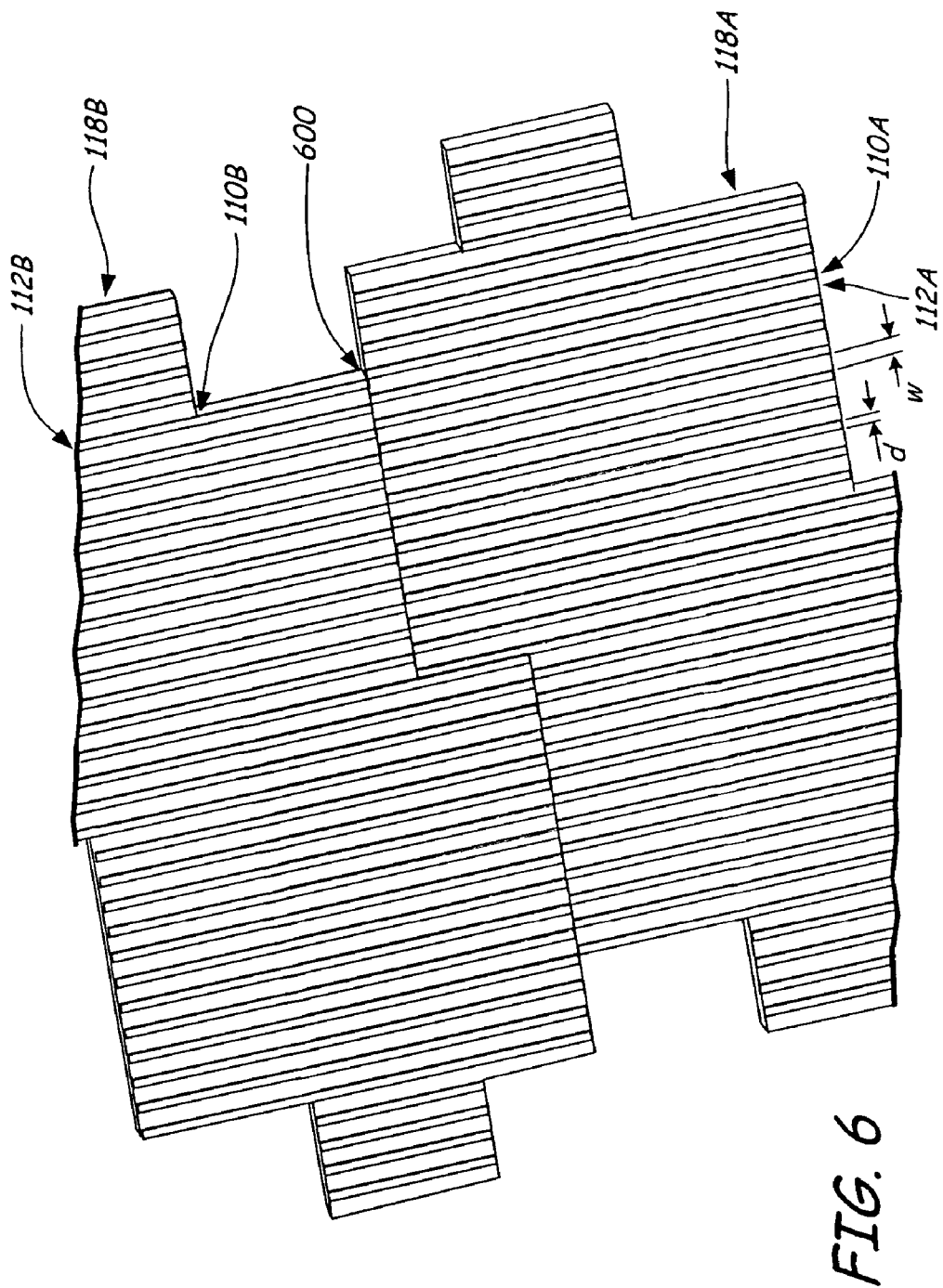
FIG. 6 shows the back sides of interconnected foam layers of two multi-layered panels.

FIG. 6 shows the back sides of two interconnected foam layers 118A, 118B. The back sides of foam layers 118A, 118B consist of a series of ribs 110A, 110B and grooves 112A, 112B. Ribs 110A, 1103 have a width that is smaller than the distance w between the edges of adjacent ribs 110A, 110B. In a preferred embodiment w equals 1.25 inch and d equals 0.75 inch. Arrow 600 shows misaligned ribs 110A, 110B and grooves 112A, 112B of adjacent foam layers 118A, 118B. It can be seen that vertical air flow is still possible despite the misaligned ribs 110A, 110B. This configuration ensures that there will always be vertical air flow no matter how interlocked multi-layered panels are connected together or if the ribs 110A, 110B and grooves 112A, 112B of adjacent multi-foam layers 118A, 118B are misaligned. Other features can be integrated onto the back of the foam layers 118A, 118B to facilitate air flow in other embodiments of the present invention.

Yet another benefit of having ribs 110A, 110B in this configuration is that it allows for easy installation of the multi-layered panels 100. Ribs 110 also serve as a continuous surface for easily applying double sided adhesive tape, or any other adhesive system, to allow easy installation of multi-layered panel 100.

Figure 7A:
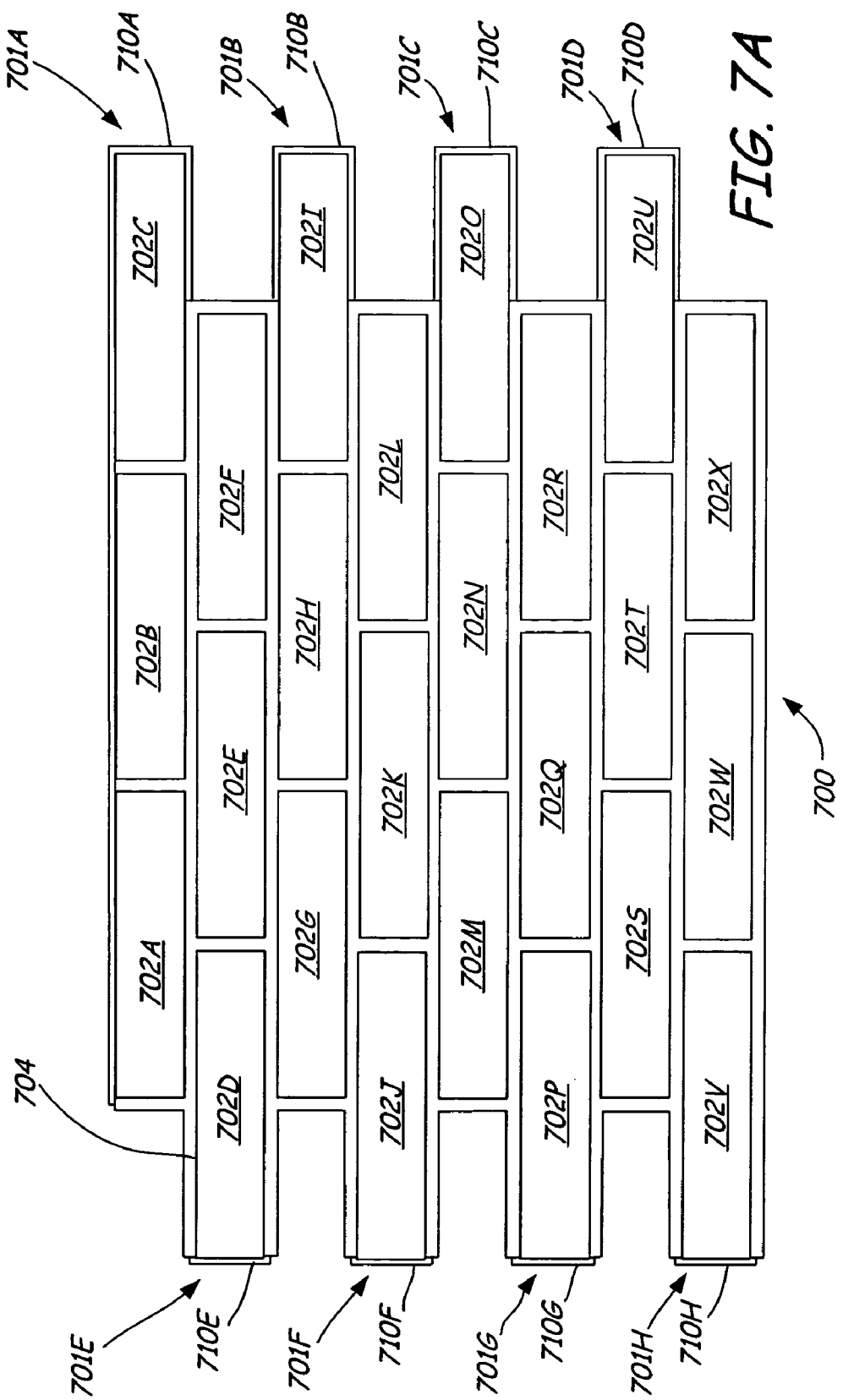
FIG. 7A shows a second embodiment of the multi-layered panel with a simulated brick finish.

FIG. 7A shows a front view of a second embodiment of the multi-layered panel 700 for use in a veneer system. In this embodiment multi-layered panel 700 has a simulated brick finish. Multi-layered panel 700 is comprised of a foam layer and a concrete layer similar to that of multi-layered panel 100 of the first embodiment. Simulated bricks 702A-702X are made up of raised regions. Simulated mortar 704 fills in the area between the bricks 702A-702X. Multi-layered panel 700 comprises eight rows of three bricks. Each row is offset by one half the length of one brick, creating a protruding row of bricks at the end of each row. A first set of rows 701A, 701B, 701C, 701D including the top row, protrude to the right. A second set of rows 701E, 701F, 701G, 701H protrude to the left. Every multi-layered panel 700 in an installed veneer system is identical. They are designed to be placed in the same orientation directly next to and on top of each other. Multi-layered panel 700 of this embodiment is constructed using a similar casting method similar to that of multi-layered panel 100 of the first embodiment.

The multi-layered panel 700 comprises an overlapping slat system for interlocking the multi-layered panels 700. The slats are part of the edge perimeter region of the foam layer. From the front view of multi-layered panel 700, the only portion of the foam layer that can be seen is the portion comprising the slats. On the right side of the first row 701A the foam layer extends beyond the concrete layer a standard width to form slat 710A. Slat 710A extends all the way around the portion of the brick 702C protruding the right side of multi-layered panel 700 and continues along the top of multi-layered panel 700. Slats 710B, 710C, 710D extend all the way around the portion of the bricks 702I, 702O, 702U protruding the right side of multi-layered panel 700. On the left side of rows 701A, 701B, 701C, 701D the concrete layer completely covers the foam layer. On the left side of the rows 701E, 701F, 701G, 701H the foam layer extends beyond the concrete layer a uniform width only on the left edge of bricks 702D, 702J, 702P, 702V protruding the left side of multi-layered panel 700 to form slats 710E, 710F, 710G, 710H. On the right side of the rows 701E, 701F, 701G the concrete layer completely covers the foam layer. On the right side of row 701H the concrete layer completely covers the foam layer and continues to do so along the bottom of multi-layered panel 700.

Figure 7B:
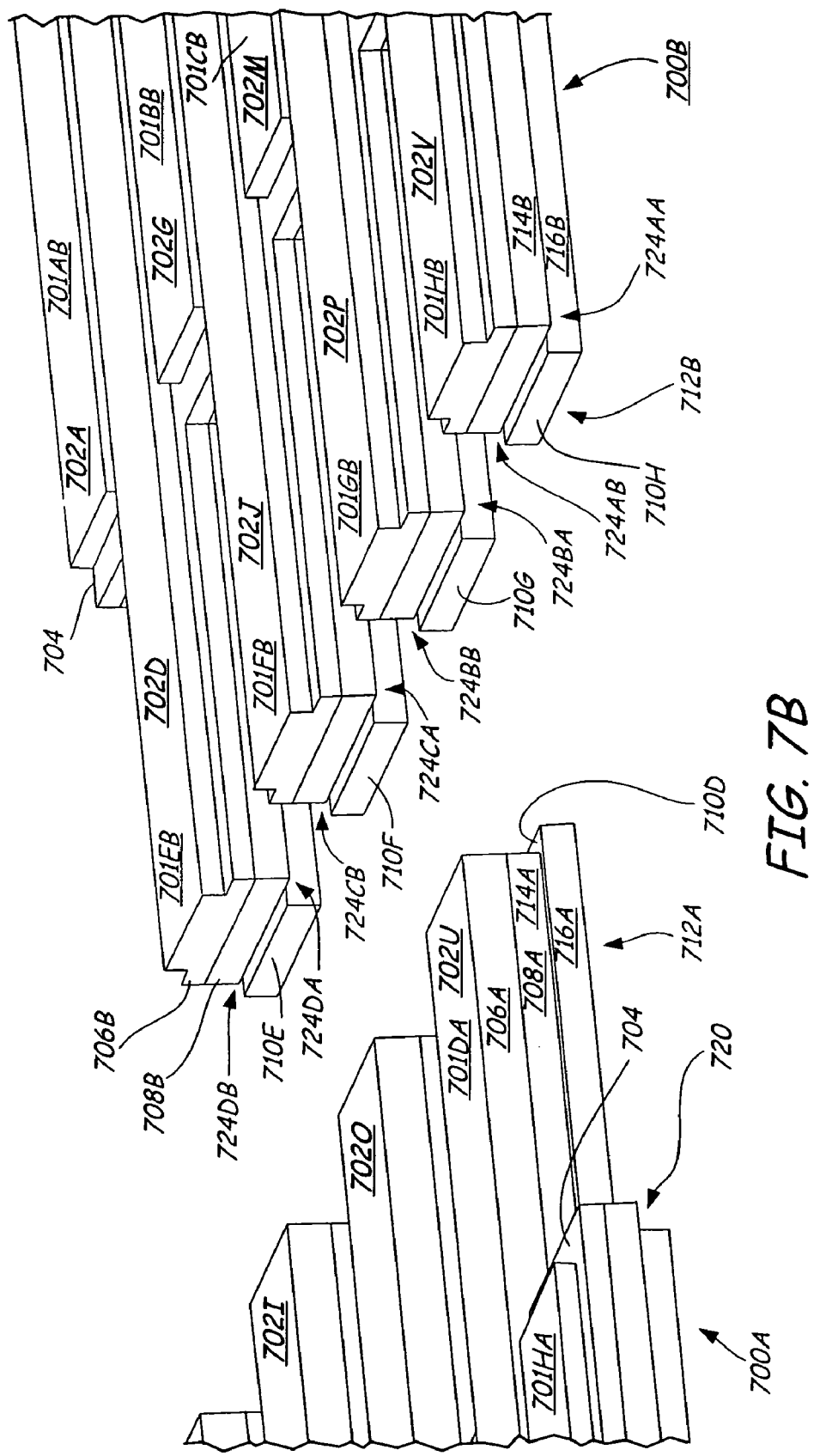
FIG. 7B shows two multi-layered panels of the second embodiment of the invention coming together.

FIG. 7B shows two multi-layered panels 700A, 700B coming together. Each multi-layered panel 700A, 700B is comprised of a concrete layer 706A, 706B and a foam layer 708A, 708B. Each concrete layer 706A, 706B is a thin layer of concrete having uniform thickness. Each brick 702A, 702G, 702M, 702D, 702J, 702P, 702V, 702I, 702O, 702U is represented by a raised region of concrete layers 706A, 706B. Mortar 704 is represented by a lowered region of concrete layers 706A, 706B. Concrete layers 706A, 706B always come to the edge of each multi-layered panel 700A, 700B at the edge of a row of bricks or at the edge of a full width of mortar 704. Concrete layers 706A, 706B are cast onto preformed foam layers 708A, 708B, respectively.

Foam layers 708A, 706B provide a solid backing that support concrete layers 706A, 706B. Foam layers 708A, 708B consist of a first portion 714A, 716B for supporting the concrete layer and a second portion 716A, 716B comprising the slats for the interlocking system. The dimensions of the front side of foam layers 708A, 708B are designed to accommodate the application of thin concrete layer 706A, 706B such that the finished multi-layered panels 700A, 700B will have the dimensions of the desired simulated brick finish.

Foam layers 708A, 708B also provide an easily shapable, lightweight material for forming other features that enhance multi-layered panels 700A, 700B. The back side of foam layers 708A, 708B can also have ribs and grooves as described in the first embodiment, shown in FIG. 6, to facilitate air flow between the multi-layered panels 708A, 708B and the surface to which it will be applied.

On row 701DA of multi-layered panel 700A, the second portion 716A of foam layer 708A extends beyond concrete layer 706A a uniform width to form slat 710D. On rows 701EB, 701FB, 701GB, 701HB of multi-layered panel 700B, the second portion 716B of foam layer 708B extends beyond concrete layer 706B a uniform width to form slats 710E, 710F, 710G, 710H. On row 701HA of multi-layered panel 700A, the first portion 714A of foam layer 708A extends beyond the second portion 716A to form a first void 720. On rows 701EB, 701FB, 701GB, 701HB of multi-layered panel 700B, the first portion 714B of foam layer 708B extends beyond the second portion 716B to form second voids 724AA, 724AB, 724BA, 724BB, 724CA, 724CB, 724DA, 724DB. Second voids 724AA, 724AB, 724BA, 724BB, 724CA, 724CB, 724DA, 724DB also extend into and meet on the leftward most portion of foam layer 716B of rows 701AB, 701BB, 701CB. Slat 710H fits into first void 720 when multi-layered panels 700A, 700B are assembled together in a side by side manner. Also, slat 710D fits between second voids 724AB and 724BA between row 701HB and row 701GB.

Multi-layered panel 700 also has a slat system for connecting multiple multi-layered panels 700 one on top of the other. Second void 724AA (Shown in FIG. 7B) continues along the bottom of multi-layered panel 700B along row 701HB. Slat 710A (Shown in FIG. 7A) runs along the top of multi-layered panel 700 along row 701A. Slat 710A of a first multi-layered panel fits into second void 724AA of a second multi-layered panel installed directly above the first multi-layered panel.

Figure 8A:
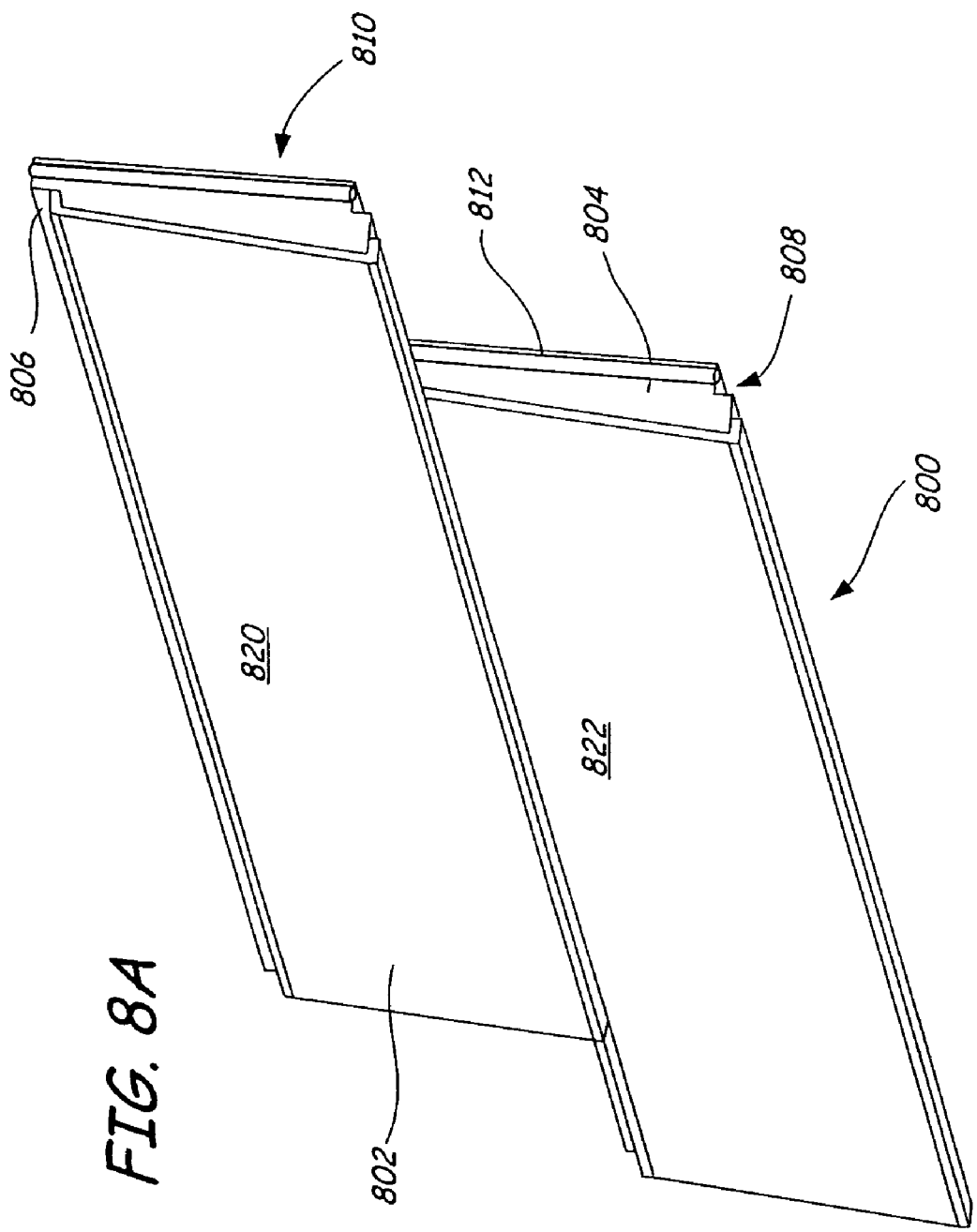
FIG. 8A shows a third embodiment of the present invention with a simulated lap siding finish.

FIG. 8A shows a third embodiment of multi-layered panel 800 for use in a veneer system. In this embodiment multi-layered panel 800 simulates lap siding. Multi-layered panel 800 can have many variations in the configuration of the lap siding. In the embodiment shown, multi-layered panel 800 comprises two offset rows of lap siding 820, 822. In other embodiments multi-layered panel 800 can have only one row of lap siding. One benefit of having offset rows 820, 822 is to facilitate alignment of multiple multi-layered panels 800 during installation of the veneer system.

Multi-layered panel 800 comprises a concrete layer 802 and a foam layer 804. The layers of this embodiment of the invention are similar to that of the first and second embodiments. The manufacturing of multi-layered panel 800 is also similar to that of the first and second embodiment. Concrete layer 802 is a thin uniformly thick layer that is cast onto foam layer 804. Thus, foam layer 804 completely fills in the back side of concrete layer 802. Concrete layer 802 simulates the look of real lap siding. Foam layer 804 provides an easily shapable, lightweight material for forming other features that enhance multi-layered panel 800. The combination of a thin concrete layer and a foam backing layer creates a panel that is extremely lightweight. Lightweight panels are easier to transport and install. Lightweight panels also make it possible to create larger panels. Larger panels reduce the number of seam lines on finished walls on which the veneer system has been installed.

Edge perimeter region 810 of multi-layered panel 800 includes a tongue and groove system. The right side of multi-layered panel 800 has a tongue 812 for insertion into a groove on a left side of an adjacent multi-layered panel 800. Along the top of multi-layered panel 800 there is a slat 806 for inserting under a lip 808 of another multi-layered panel 800.

Figure 8B:
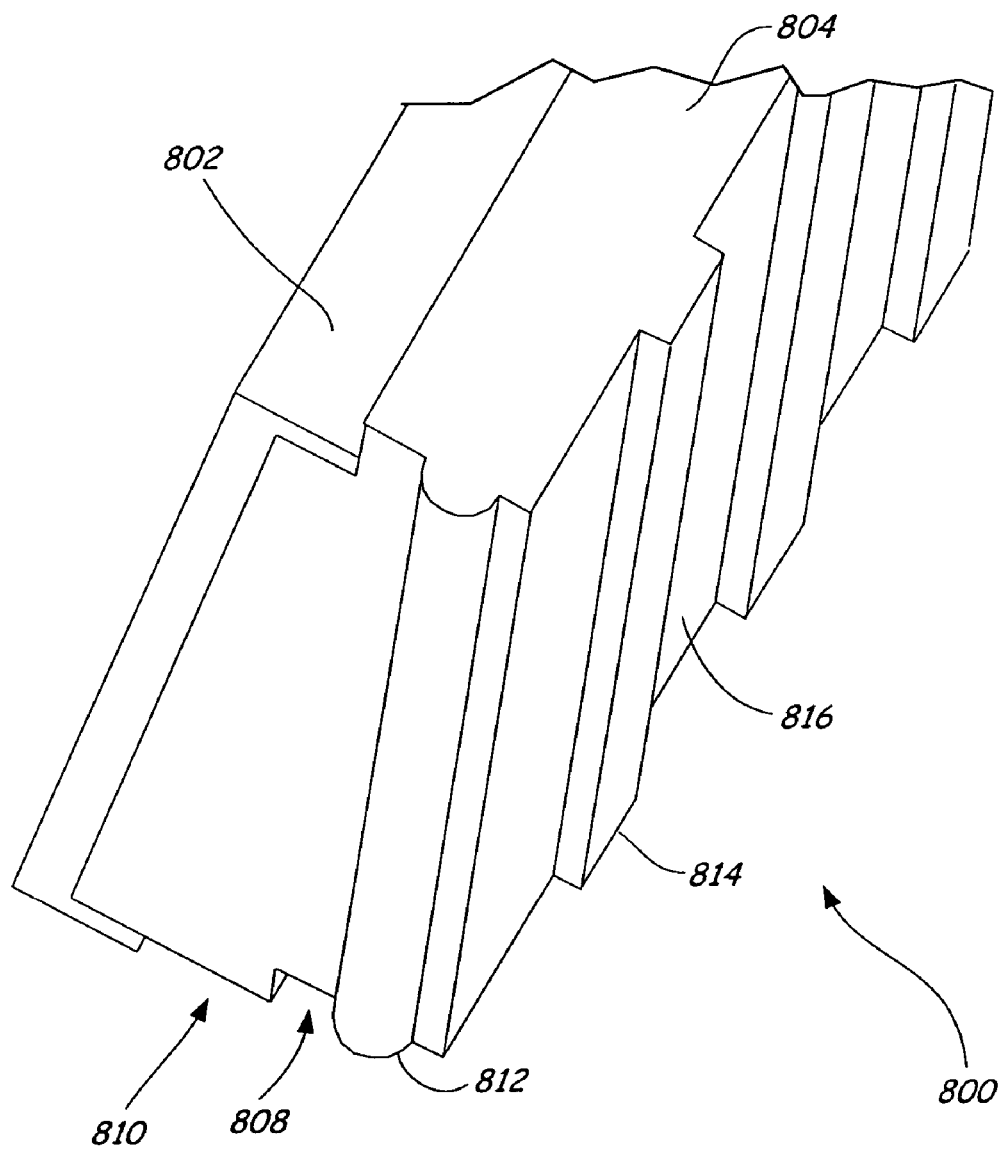
FIG. 8B. shows the edge perimeter region and back side of the multi-layered panel.

FIG. 8B shows edge perimeter region 810 and the back side of multi-layered panel 800. Tongue 812 of the tongue and groove system can be seen. The rib 814 and groove 816 system of the back side of multi-layered panel 800 can also be seen. The rib 814 and groove 816 system is similar in design and operation as the rib 110 and groove 112 system of the first embodiment of multi-layered panel 100, shown in FIGS. 1B, 1C and 6. The contours allow airflow between multi-layered panel 800 and the surface to which it will be mounted. The ribs 814 also serve as a continuous surface for easily applying double sided adhesive tape, or any other adhesive system, to allow easy installation of multi-layered panel 800.

Figure 9:
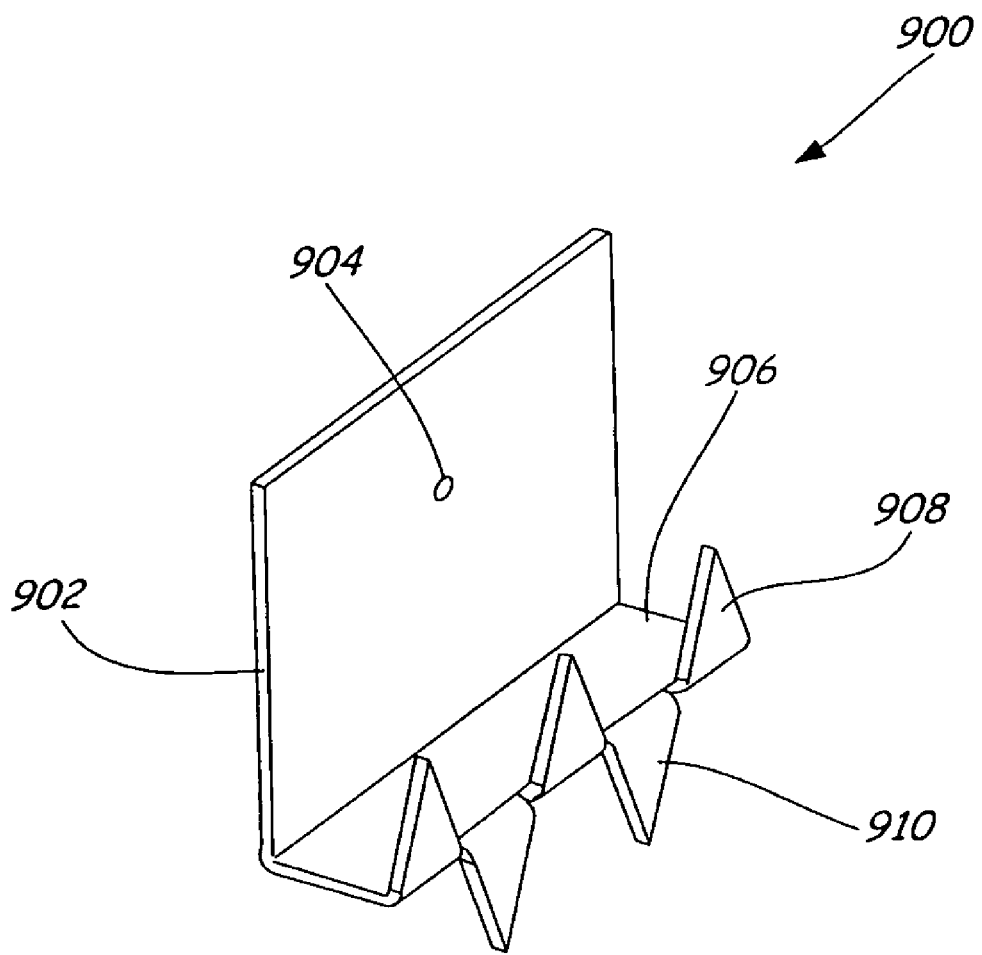
FIG. 9. shows a fastener that can be used in conjunction with the present invention.

FIG. 9 shows a fastener 900 that can be used in conjunction with the present invention. Fastener 900 is used to install multi-layered panels on a surface of a wall. Fastener 900 consists of mounting member 902 for mating with a surface to which the multi-layered panel will be mounted. Mounting member 902 contains hole 904 to allow fastener 900 to be nailed or screwed to the mounting surface. Fastener 900 also has support member 906 that supports the multi-layered panel. Support member 906 has upward facing teeth 908 and downward facing teeth 910. Upward facing teeth 908 and downward facing teeth 910 are for insertion into the foam layer of the multi-layered panel.

Fastener 900 can be nailed or screwed to a mounting surface at a desired position. Then, a multi-layered panel can be placed with its back surface against the mounting surface above fastener 900. It is then slid down so that its bottom surface engages upward facing teeth 908. The bottom surface of multi-layered panel 100 should rest on the top surface of support member 906 such that upward facing teeth 908 are inserted into the foam layer of the multi-layered panel. Next, a second fastener 900 can be placed Against the mounting surface above the multi-layered panel and slid down so that downward facing teeth 910 engage the top foam layer and the bottom of support member 906 rests on the top surface of the multi-layered panel. The second fastener 900 is then secured in place by driving a nail or screw through hole 904 of the second fastener 900.

Although the present invention has been described with reference to preferred embodiments, workers skilled in the art will recognize that changes maybe made in form and detail without departing from the spirit and scope of the invention.

The invention claimed is:

1. A multi-layered panel that simulates a finish of a wall comprising:
    a foam backing layer having:
        a front bonding surface having a topography of a wall finish, the topography comprising raised regions and lowered regions;
        a back surface for mounting on a surface of a building, the back surface comprising a series of ribs and grooves to allow airflow between the foam backing layer and the surface of the building; and
        an edge perimeter region; and
    a precast concrete layer permanently adhered to an entirety of the front bonding surface of the foam backing layer to an approximately uniform thickness to produce a veneer simulating a texture of the wall finish and such that the raised regions and lowered regions of the topography of the wall finish are perceptible when the back surface of the foam backing layer is mounted to the surface of the building.

2. The multi-layered panel of claim 1 wherein the finish of the wall is selected from the group consisting of: a brick pattern, a log pattern, a lap siding pattern, a shingle pattern and a stone pattern.

3. The multi-layered panel of claim 1 wherein the edge perimeter region of the foam backing layer comprises a system for interlocking adjoining multi-layered panels.

4. The edge perimeter region of claim 3 wherein the system for interlocking adjoining multi-layered panels comprises a tongue and groove system.

5. The edge perimeter region of claim 3 wherein the system for interlocking adjoining multi-layered panels comprises a slat system.

6. The system of claim 1 wherein the grooves have a width that is wider than the ribs.

7. The system of claim 1 wherein the grooves have a width of 1.25 inches and the ribs have a width of 0.75 inches.

8. The multi-layered panel of claim 7 wherein the series of ribs and grooves comprises a plurality of longitudinal ribs and grooves.

9. The multi-layered panel of claim 8 wherein the ribs and grooves have rectangular profiles such that the ribs include a flat surface for mounting parallel and flush along the surface of the building.

10. The multi-layered panel of claim 1 wherein the front bonding surface of the foam backing layer supports the entirety of the precast concrete layer.

11. The multi-layered panel of claim 10 wherein the foam backing layer is thicker than the precast concrete layer.

12. The multi-layered panel of claim 11 wherein the precast concrete layer is about 0.25 to about 0.375 inches thick.

13. The multi-layered panel of claim 1 wherein the concrete of the precast concrete layer is a fiber reinforced concrete mixture.

14. The multi-layered panel of claim 1 wherein the edge perimeter region follows a portion of the veneer simulating a mortar region of the finish of the wall.

15. The multi-layered panel of claim 1 wherein the edge perimeter region exhibits one-hundred-eighty degree symmetry.

16. The multi-layered panel of claim 15 wherein the finish of the wall comprises a stone pattern having at least three different sized and uniquely shaped rectangular stones that produce the one-hundred-eighty degree symmetry of the edge perimeter region.

17. The multi-layered panel of claim 1 and further comprising a fastener comprising:
   a mounting member for mounting on the surface of the building; and
   a support member extending from the mounting member to receive a portion of the edge perimeter region, the support member comprising:
      upward facing teeth inserted into the portion of the edge perimeter region located on the support member; and
      downward facing teeth for insertion into a portion of an edge perimeter region of an adjacent multi-layered panel located below the fastener.

18. The multi-layered panel of claim 1 wherein the topography of the wall comprises a plurality of raised regions and lowered regions and wherein the precast concrete layer covers the raised regions and lowered regions in approximately equal thicknesses.

19. The multi-layered panel of claim 18 wherein the precast concrete layer comprises:
   a concealed interior surface adhered to the front bonding surface and conforming to the topography of the wall; and
   an exposed exterior surface conforming to the topography of the wall such that the raised regions and lowered regions are perceptible through the precast concrete layer.

20. A multi-layered panel that simulates a finish of a wall comprising:
   a foam backing layer having:
      a front bonding surface having raised regions and lowered regions that produce a likeness of the finish of the wall;
      a back surface for mounting on a surface of a building, the back surface including a series of ribs and grooves for allowing air flow between the back surface of the foam layer and the surface to which the panel will be mounted; and
      an edge perimeter region including a system for interlocking adjoining multi-layered panels; and
   a precast concrete layer having an interior surface adhered to the front bonding surface of the foam backing layer such that the raised regions and the lowered regions of the front bonding surface are perceptible from an exterior surface of the precast concrete layer, the exterior surface producing a veneer simulating a texture and likeness of the finish of the wall.

* * * * *

UNITED STATES PATENT AND TRADEMARK OFFICE
CERTIFICATE OF CORRECTION

PATENT NO.       : 7,647,738 B2
APPLICATION NO. : 11/020546
DATED            : January 19, 2010
INVENTOR(S)      : Paul C. Nasvik It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1427 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,738 B2 | Page 1 of 1 |
| APPLICATION NO. | : 11/020546 | |
| DATED | : January 19, 2010 | |
| INVENTOR(S) | : Paul C. Nasvik | |

It is certified that error appears in the above-identified patent and that said Letters Patent is hereby corrected as shown below:

Col. 4, Line 26
 Delete "arid"
 Insert --and--

Col. 5, Line 36
 Delete ","

Col. 6, Line 47
 Delete "100HB"
 Insert --106HB--

Col. 7, Line 57
 Delete "1103"
 Insert --110B--

Col. 8, Line 65
 Delete "706B"
 Insert --708B--

Col. 10, Line 42
 Delete "Against"
 Insert --against--

Signed and Sealed this
Fourteenth Day of June, 2011

David J. Kappos
*Director of the United States Patent and Trademark Office*